(12) United States Patent
Clark et al.

(10) Patent No.: US 7,392,261 B2
(45) Date of Patent: Jun. 24, 2008

(54) METHOD, SYSTEM, AND PROGRAM FOR MAINTAINING A NAMESPACE OF FILESETS ACCESSIBLE TO CLIENTS OVER A NETWORK

(75) Inventors: Thomas Keith Clark, Gresham, OR (US); Jason Christopher Young, Portland, OR (US); Stephen F. Correl, Beaverton, OR (US); James John Seeger, Portland, OR (US)

(73) Assignee: International Business Machines Corporation, Armonk, NY (US)

( * ) Notice: Subject to any disclaimer, the term of this patent is extended or adjusted under 35 U.S.C. 154(b) by 462 days.

(21) Appl. No.: 10/851,863

(22) Filed: May 20, 2004

(65) Prior Publication Data

US 2005/0273451 A1 Dec. 8, 2005

(51) Int. Cl.
*G06F 17/00* (2006.01)
*G06F 7/00* (2006.01)
*G06F 17/30* (2006.01)

(52) U.S. Cl. .............................. 707/102; 707/1; 707/10
(58) Field of Classification Search ................ 707/102, 707/1, 10
See application file for complete search history.

(56) References Cited

U.S. PATENT DOCUMENTS

| | | | |
|---|---|---|---|
| 5,689,701 A * | 11/1997 | Ault et al. ..................... 707/10 |
| 6,026,452 A | 2/2000 | Pitts |
| 6,219,753 B1 | 4/2001 | Richardson |
| 6,324,581 B1 * | 11/2001 | Xu et al. ..................... 709/229 |
| 6,353,837 B1 | 3/2002 | Blumenau |
| 6,625,604 B2 | 9/2003 | Muntz et al. |
| 6,687,716 B1 | 2/2004 | Bradley |
| 6,697,846 B1 * | 2/2004 | Soltis ......................... 709/217 |
| 6,922,688 B1 * | 7/2005 | Frey, Jr. ....................... 707/2 |
| 6,976,060 B2 * | 12/2005 | Manczak et al. ............. 709/219 |
| 7,024,427 B2 * | 4/2006 | Bobbitt et al. .............. 707/200 |
| 2001/0020254 A1 | 9/2001 | Blumenau et al. |

(Continued)

FOREIGN PATENT DOCUMENTS

WO    WO 02/065342 A1    8/2002

OTHER PUBLICATIONS

Glagoleva, Alexandra, et al., "A Load Balancing Tool Based on Mining Access Patterns for Distributed File System Servers", Proc. of the 35th Hawaii Int'l Conf. on System Sciences, Jan. 7-10, 2002, pp. 1248-1255.*

(Continued)

*Primary Examiner*—John E. Breene
*Assistant Examiner*—Robert Stevens
(74) *Attorney, Agent, or Firm*—David W. Victor; Konrad Raynes & Victor LLP

(57) ABSTRACT

Provided are a method, system, and program maintaining information on a namespace comprised of filesets shared by clients over a network. Zone information is maintained on at least one zone, wherein each zone associates at least one client system, at least one fileset, and at least one storage pool. For one zone, the associated at least one fileset and at least one storage pool are accessible to the at least one client system. Clients are provided information on filesets included in a namespace, wherein each of a plurality of clients receive information on the at least one fileset associated with the client in the at least one zone including the client.

10 Claims, 7 Drawing Sheets

U.S. PATENT DOCUMENTS

| | | | |
|---|---|---|---|
| 2002/0042866 A1 | 4/2002 | Grant et al. | |
| 2003/0033308 A1* | 2/2003 | Patel et al. | 707/10 |
| 2003/0135782 A1 | 7/2003 | Matsunami et al. | |
| 2003/0149695 A1 | 8/2003 | Delaire et al. | |
| 2004/0098415 A1* | 5/2004 | Bone et al. | 707/200 |
| 2004/0133577 A1* | 7/2004 | Miloushev et al. | 707/10 |
| 2004/0133607 A1* | 7/2004 | Miloushev et al. | 707/200 |
| 2004/0193594 A1* | 9/2004 | Moore et al. | 707/4 |
| 2004/0243828 A1* | 12/2004 | Aguilera et al. | 713/200 |
| 2005/0060281 A1* | 3/2005 | Bucher et al. | 707/1 |
| 2006/0080353 A1* | 4/2006 | Miloushev et al. | 707/102 |

OTHER PUBLICATIONS

Hua, Han et al., "A Scheme to Construct Global File System", IEEE 0-7695-1393-X/02, © 2002, pp. 206-212.*

Karamanolis, Peter, et al., "An Architecture for Scalable and Manageable File Services", Hewlett-Packard Technical Labs Technical Report HPL-2001-173, © 2001, pp. i and 1-14 (downloaded from: http://www.hpl.hp.com/techreports/2001/HPL-2001-173.pdf).*

Akinlar, Cuneyt, et al., "A Scalable Distributed Multimedia File System Using Network Attached Autonomous Disks", 8th International Symposium on Modeling, analysis and Simulation of Computer and Telecommunication Systems, Aug. 29-Sep. 1, 2000, pp. 180-187.*

Menon, J., et al., "IBM Storage Tank—A Heterogeneous Scalable SAN File System", IBM Systems Journal, vol. 42 No. 3, Apr. 22, 2003, pp. 1-24 (downloaded from: http:// www.research.ibm.com/journal/sj/422/menon.html).*

PCT International Search Report, PCT/EP2005/052328 filed May 20, 2005.

PCT Written Opinion, PCT/EP2005/052328 filed May 20, 2005.

Microsoft, "Distributed File System: A Logical View of Physical Storage", XP-00234083, May 16, 2001, pp. 1-38.

J. Menon, et al., "IBM Storage Tank—A Heterogenous Scalable San File System", IBM Corp., IBM Systems Journal, vol. 42, No. 2, 2003, pp. 250-267.

B.W. Lampson, et al. "An Open Operating System for a Single-User Machine.", ACM, 1979, pp. 98-105.

J. Mostek et al.. "Porting the SGI XFS File System to Linux." Proceedings of FREENIX Track: 200 USENIX Annual Technical Conference, Jun. 2000.

V. Cardellini, et al., "*The State of the Art in Locally Distributed Web-Server Systems.*" ACM Computing Surveys, vol. 34, No. 2, Jun. 2002, pp. 263-311.

A. Wang, et al., "*Conquest*: Better Performance Through a Disk/Persistent-RAM Hybrid File System." Proceedings of the 2002 USENIX Annual Technical Conference, Jun. 2002.

G. Karjoth. "Access Control with IBM Tivoli Access Manager." ACM Transactions on Information System Security, vol. 6, No. 2, May 203, pp. 232-257.

Brooks, C., et al. *"IBM Total Storage: Introducing the SAN File System,"* 352 pages [online] Available from ibm.com.redbooks, Nov. 2003.

Menon, J., et al. *"IBM Storage Tank-A Heterogenous Scalable SAN file system."* IBM Systems Journal, vol. 42, No. 2, 2003, pp. 250-267.

EPO Communication dated Aug. 10, 2007 re Application No. 05 752 774.9-1225.

EPO Communication Pursuant to Article 96(2) EPC dated Oct. 8, 2007 for Application No. 05 752 774.9-1225.

Response dated Jan. 30, 2008 to EPO Communication Pursuant to Article 96(2) dated Oct. 8, 2007 for Application No. 05 752 774.9-1225.

\* cited by examiner

METHOD, SYSTEM, AND PROGRAM FOR MAINTAINING A NAMESPACE OF FILESETS ACCESSIBLE TO CLIENTS OVER A NETWORK

BACKGROUND OF THE INVENTION

1. Field of the Invention

The present invention relates to a method, system, and program for maintaining a namespace of filesets accessible to clients over a network.

2. Description of the Related Art

In a distributed file system, clients share a global namespace addressing storage locations on distributed storage devices. A central server manages the distributed file namespace for the clients. For instance, a metadata server cluster comprised of multiple server devices may maintain the global namespace of a distributed file system stored in different storage pools for the clients. The global namespace is organized into filesets, which comprise file system directories and folders accessible to the clients for file operations. On the clients, the global namespace appears as a hierarchical file directory provided by the operating system running on the client.

The metadata servers would create and manage filesets and define policy rules that determine in which storage pools files are stored. The metadata servers may manage a list of rules that are considered when creating a file. A rule condition may indicate a file type, fileset or client and an associated storage pool in which to create the file. The metadata server scans the list of rules to determine which rule applies to the file create request, i.e., which rule identifies the file type of the file request, the fileset in which the file is created and/or the client initiating the file request. If the rule condition is satisfied, then the file is created in the storage pool associated with the satisfied rule. Further details of a distributed file system using metadata servers is described in the International Business Machines Corporation ("IBM") publication "IBM Total Storage: Introducing the SAN File System", document no. SG24-7057-00 (November 2003), which publication is incorporated herein by reference in its entirety.

SUMMARY

Provided are a method, system, and program maintaining information on a namespace comprised of filesets shared by clients over a network. Zone information is maintained on at least one zone, wherein each zone associates at least one client system, at least one fileset, and at least one storage pool. For one zone, the associated at least one fileset and at least one storage pool are accessible to the at least one client system. Clients are provided information on filesets included in a namespace, wherein each of a plurality of clients receive information on the at least one fileset associated with the client in the at least one zone including the client.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
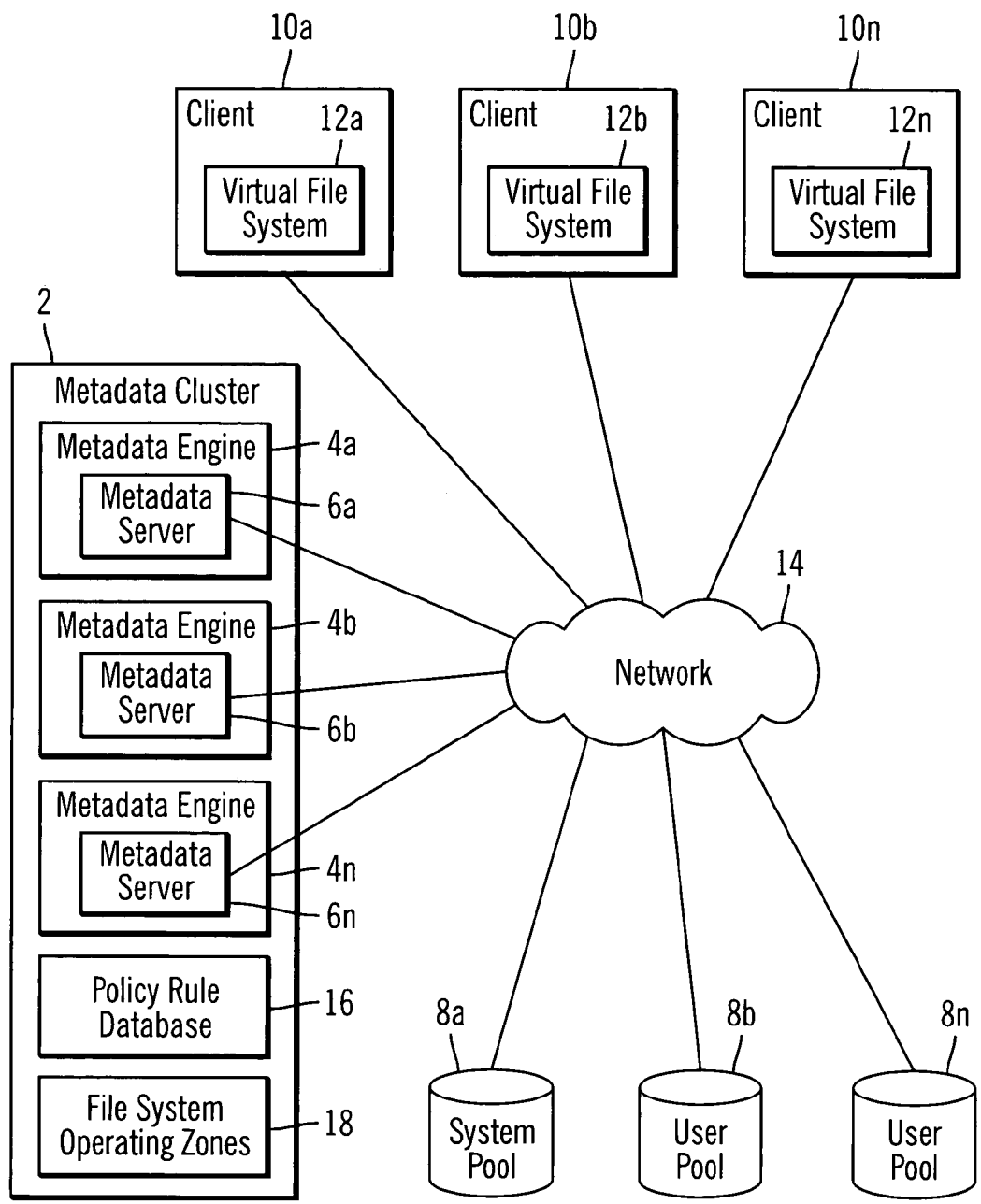
FIG. 1 illustrates a network computing environment in which embodiments are implemented.

FIG. 1 illustrates a distributed file system computing environment in accordance with embodiments. A metadata cluster 2 includes a plurality of metadata engines 4a, 4b ... 4n that include metadata server programs 6a, 6b ... 6n to manage a global namespace referencing files stored in storage pools 8a, 8b ... 8n. The metadata cluster 2 manages the client 10a, 10b ... 10n access to filesets defined in the global namespace. Each client 10a, 10b ... 10n includes a client virtual file system 12a, 12b ... 12n that interfaces the clients 10a, 10b ... 10n with those filesets in the global namespace the client may access. The metadata cluster 2, clients 10a, 10b ... 10n, and storage pools 8a, 8b ... 8n communicate over a network 14. The variable "n" indicates any number of elements and may have different values when used with different elements.

The metadata engines 4a, 4b ... 4n may comprise server class systems. Each metadata engine 4a, 4b ... 4n may be assigned to handle particular filesets in the global namespace, such that the workload of the global namespace is distributed across the metadata engines 4a, 4b ... 4n. The filesets appear to the clients 10a, 10b ... 10n as standard directories and folders in a hierarchical file system. The metadata server 6a, 6b ... 6n performs the global namespace management operations and maintains file metadata comprising information on the filesets the clients 10a, 10b ... 10n access and system metadata on the filesets, including a policy rule database 16 of storage management rules, and zone definitions 18.

The client virtual file systems 12a, 12b ... 12n mounts the filesets the clients 10a, 10b ... 10n may access according to the zones defined in the zone definitions 18. A storage pool 8a, 8b ... 8n is a collection of volumes in the storage devices. In certain embodiments, the system pool 8a comprises storage devices that store the namespace metadata, e.g., file and system metadata. In certain embodiments, the user pools 8b ... 8n comprise storage devices that store the user data in the filesets managed by the metadata cluster 2. The storage devices assigned to the storage pools 8a, 8b ... 8n may comprise storage systems known in the art, such as a Direct Access Storage Device (DASD), Just a Bunch of Disks (JBOD), a Redundant Array of Independent Disks (RAID), virtualization device, tape storage, optical disk storage, or any other storage system known in the art. The clients 10a, 10 ... 10n comprises computing devices known in the art, such as a workstation, desktop computer, server, mainframe, handheld computer, telephony device, etc. The network 14 comprises networks known in the art, such as such as a Local Area Network (LAN), Storage Area Network (SAN), Wide Area Network (WAN), InfiniBand, a wireless network, etc.

Figure 2:
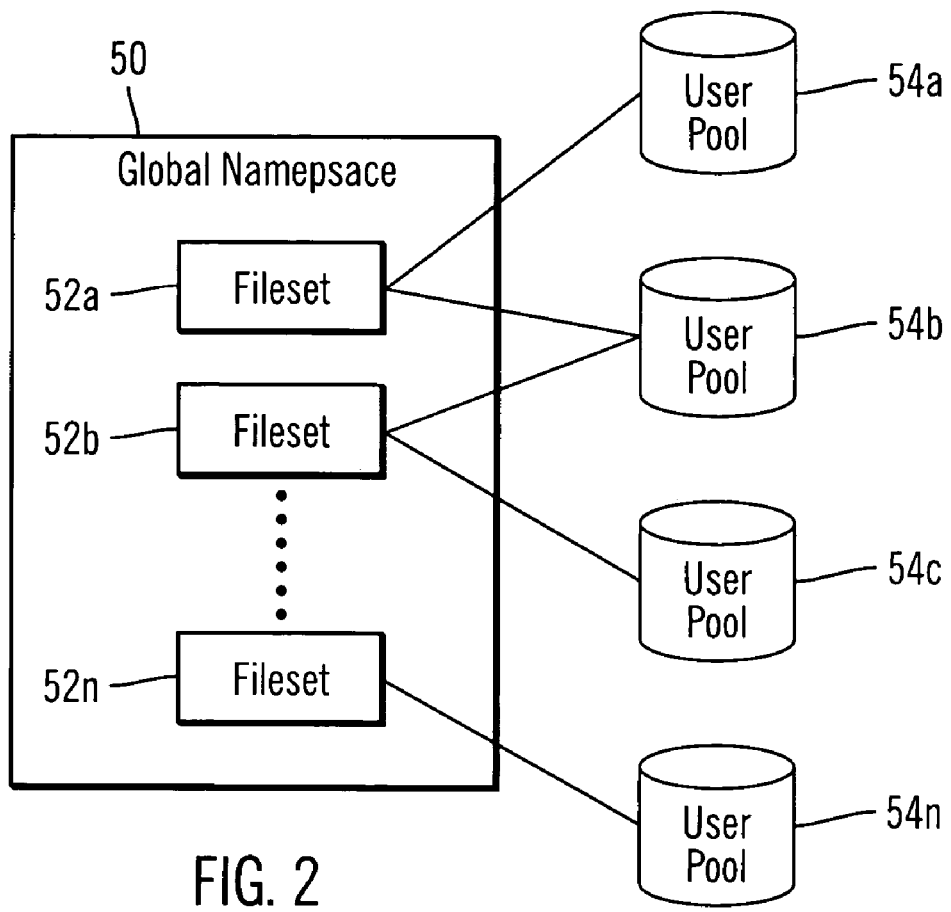
FIG. 2 illustrates an example of a global namespace having filesets.

FIG. 2 illustrates a view of a global namespace 50, i.e., distributed file system, comprised of a plurality of file sets 52a, 52b . . . 52n that map to storage pools 54a, 54b . . . 54n, such as user pools 8b . . . 8n. As discussed the storage pools 54a, 54b . . . 54n comprise storage systems and devices connected to the network 14 to store the filesets 52a, 52 . . . 52n in the global namespace 50. One fileset, e.g., 52b, may map to multiple storage pools, e.g., 54b, 54c, and multiple filesets, e.g., 52a, 52b, may map to a same storage pool, e.g., 54b.

Figure 3:
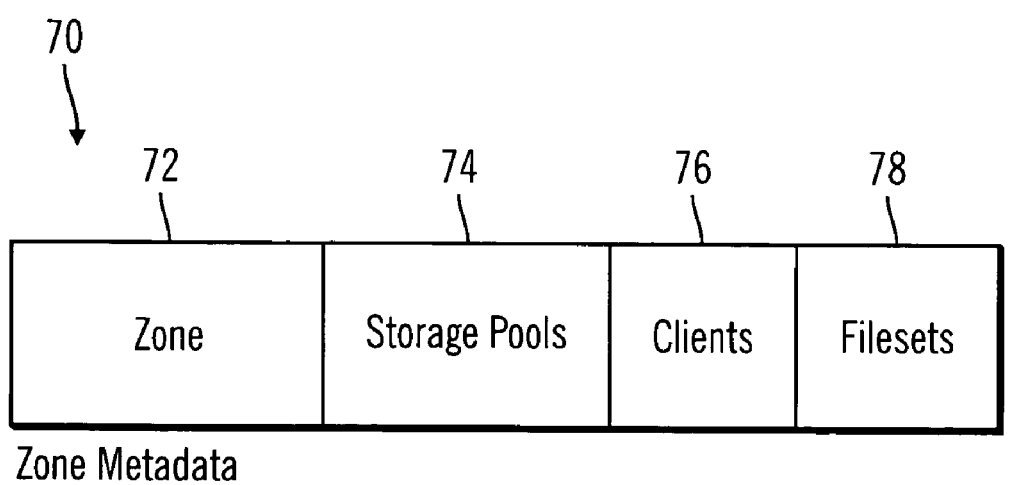
FIG. 3 illustrates zone metadata.

FIG. 3 illustrates zone metadata 70 for a zone in the zone definitions 18. The zone metadata 70 may include a zone identifier 72, such as a name or number; the storage pools 74 assigned to that zone 72; clients 76 assigned to the zone; and filesets 78 assigned to the zone. Each zone associates at least one client system, at least one fileset, and at least one storage pool. A storage pool is comprised of one or more storage devices or systems. With this zone association, the associated at least one file set and at least one storage device are accessible to the at least one client system. In certain embodiments, one client 10a, 10b . . . 10n can be associated with multiple zones so that the client is enabled to access the filesets and storage pools in the associated zones. Further, the clients 10a, 10b . . . 10n are restricted to performing operations with respect to file sets and storage devices in the zones including the client.

Figure 4:
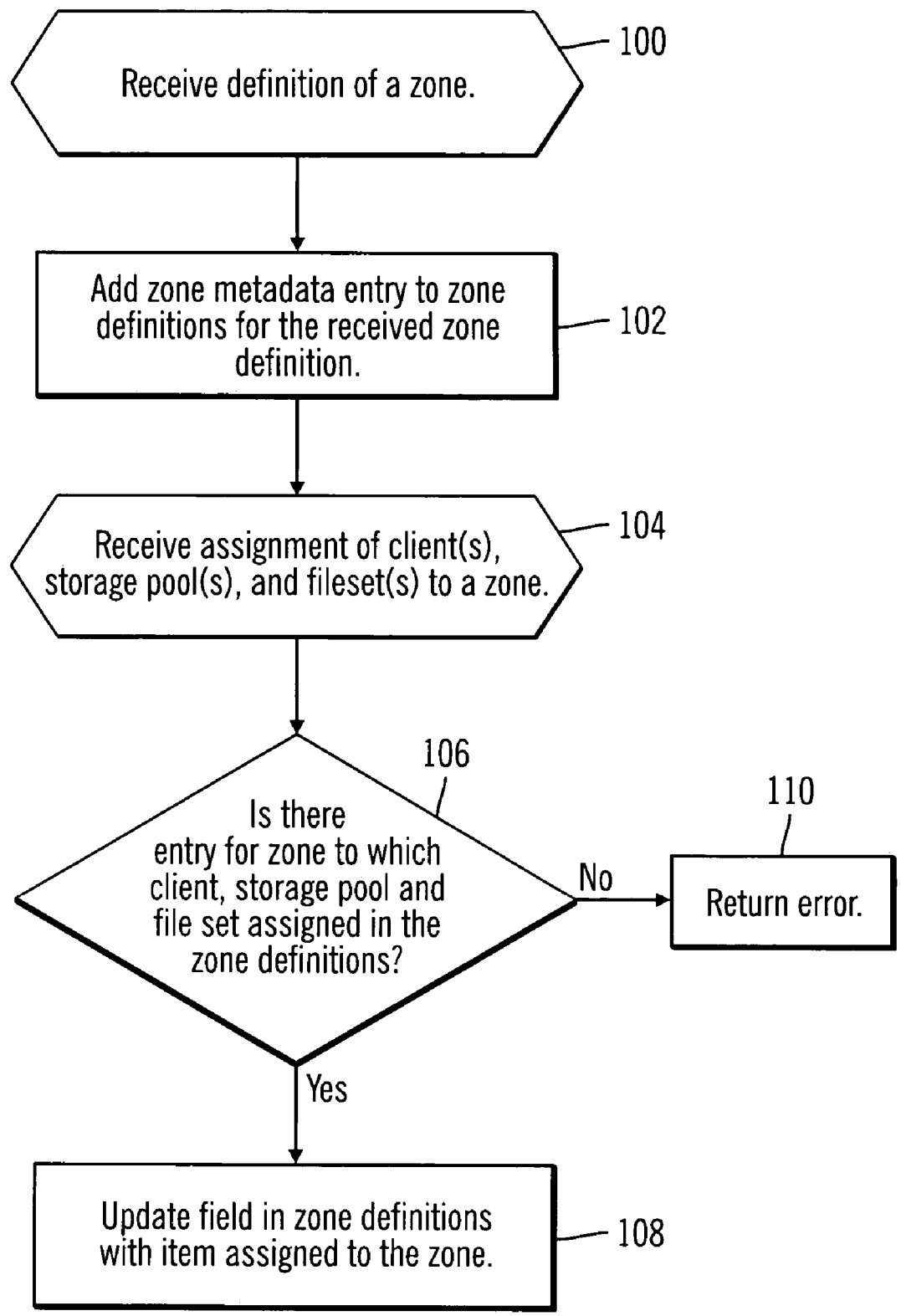
FIG. 4 illustrates operations to maintain zones.

FIG. 4 illustrates operations performed by the metadata server 6a, 6 . . . 6n program to maintain the zone definitions 18. Upon receiving (at block 100) a zone definition, which comprises an association of a client(s), fileset, and/or storage pool, the metadata server 6a, 6b . . . 6n adds (at block 102) a zone metadata entry 70 to the zone definitions 18. Upon receiving (at block 104) an assignment of client(s) 10a, 10b . . . 10n, storage pool(s) 8b . . . 8n, and fileset(s) 52a, 52b . . . 52n to a zone, if (at block 106) there is already zone metadata define 72 for the zone to update, then the metadata server 6a, 6b . . . 6n updates (at block 108) the zone metadata 70 with the storage pools, clients and/or filesets assigned to the zone. If (at block 106) there is no defined operating zone to which the assignment is made, an error is returned (at block 110).

Figure 5:
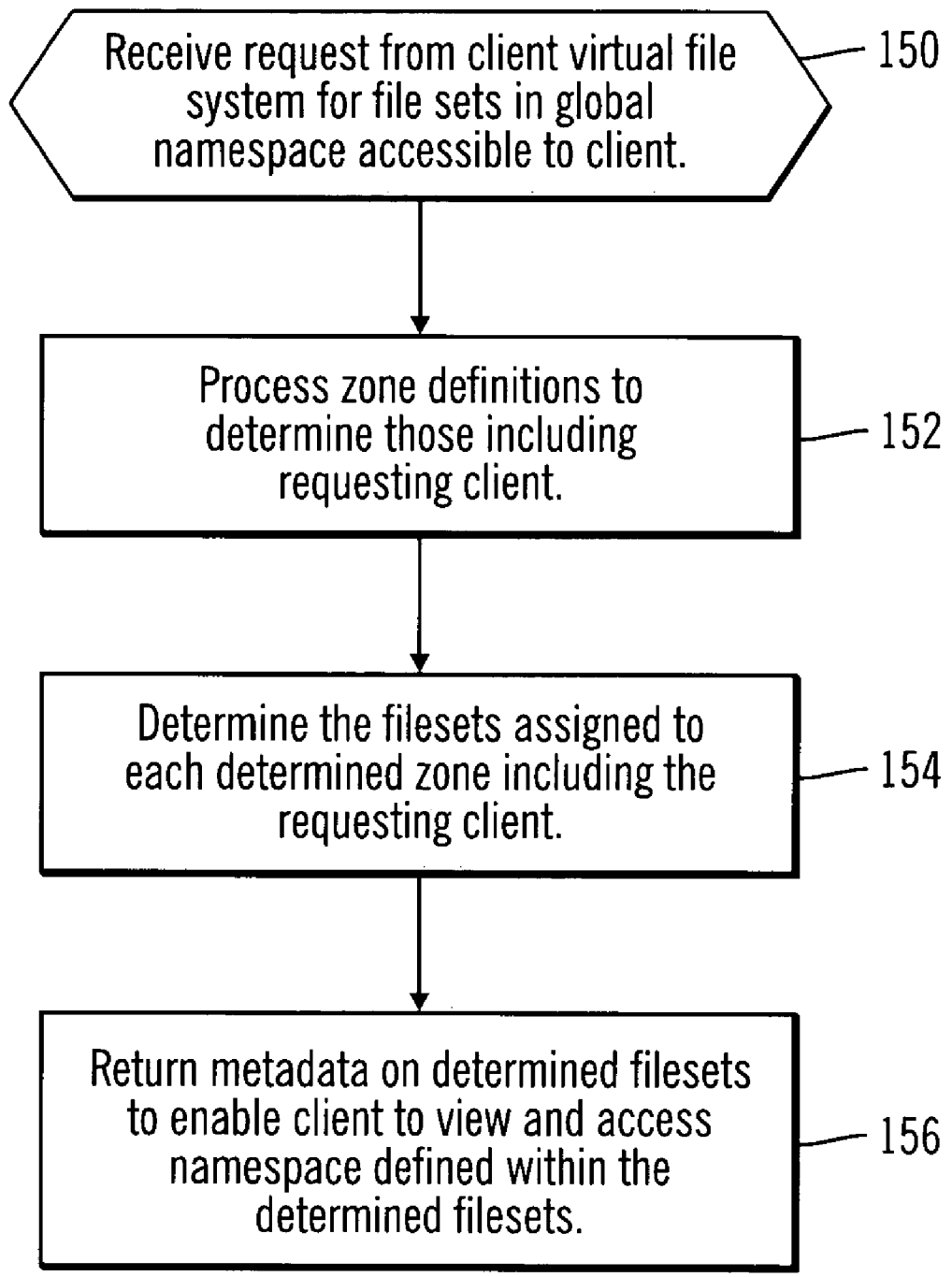
FIG. 5 illustrates operations performed to provide information on filesets accessible to the client to the client.

FIG. 5 illustrates operations performed by the metadata server 6a, 6b . . . 6n program to provide the clients 10a, 10b . . . 10n information on the filesets 52a, 52b . . . 52n included in a namespace 50. Each of the clients 10a, 10b . . . 10n receive information on at least one fileset 52a, 52b . . . 52n associated with the client 10a, 10b . . . 10n in the at least one zone including the client. Upon receiving (at block 150) a request from a client virtual file system 12a, 12b . . . 12n for file sets in a global namespace accessible to client, the metadata server 6a, 6b . . . 6n processes (at block 152) the zone definitions 18 (FIG. 1) to determine those including the requesting client 10a, 10b . . . 10n. The metadata server 6a, 6b . . . 6n determines (at block 154) the filesets 52a, 52b . . . 52n assigned to each determined zone including the requesting client 10a, 10b . . . 10n. Metadata on the determined filesets is returned (at block 156) to the requesting client virtual file system 12a, 12b . . . 12n to enable the client to view and access that portion of the namespace included in the determined filesets. The virtual file system 12a, 12b . . . 12n may render the fileset information as in a hierarchical file system format, including hierarchically arranged directories and files. The metadata servers 6a, 6b . . . 6n may provide the client virtual file systems 12a, 12b . . . 12n with information on filesets 52a, 52b . . . 52n assigned to the client in response to updating the fileset information.

In alternative embodiments, the metadata servers 6a, 6b . . . 6n may provide information on the file sets 52a, 52b . . . 52n to the client virtual file system 12a, 12b . . . 12n in response to the client as the client makes requests to the global namespace 50. In such embodiments, the metadata servers 6a, 6b . . . 6n may deny access to a portion of the namespace 50 not in a file operating zone associated with the client by returning an indication that the requested file (or fileset) does not exist, thereby returning errors when an off-limits area is attempted to be accessed.

Figure 6:
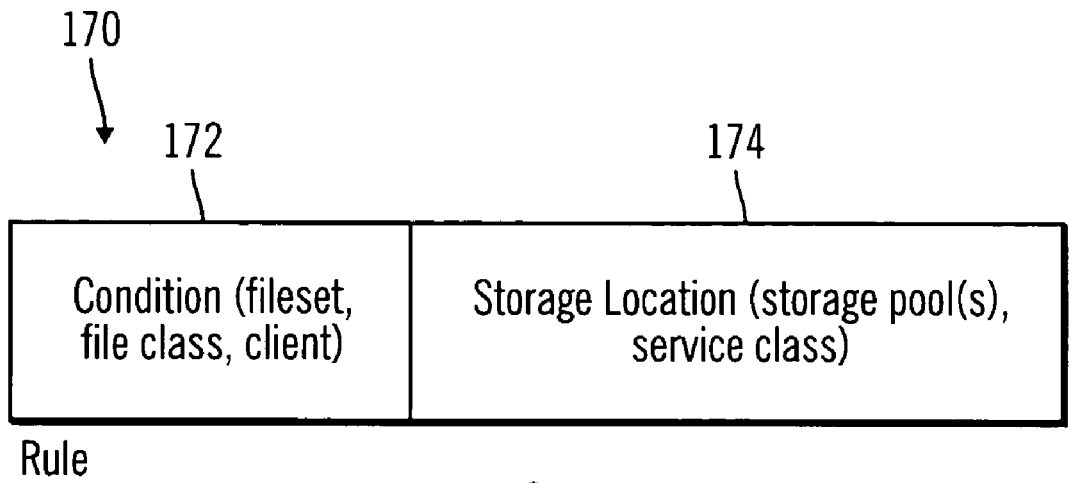
FIG. 6 illustrates policy rule information.

FIG. 6 illustrates a policy rule 170 specifying a condition 172 and a storage rule 174. The condition 172 indicates a fileset, file class (such as file type, file extension, etc.), and/or a client 10a, 10b . . . 10n. The storage location 174 indicates a storage pool or service class in which to store a file being created that satisfies the condition 172.

Figure 7:
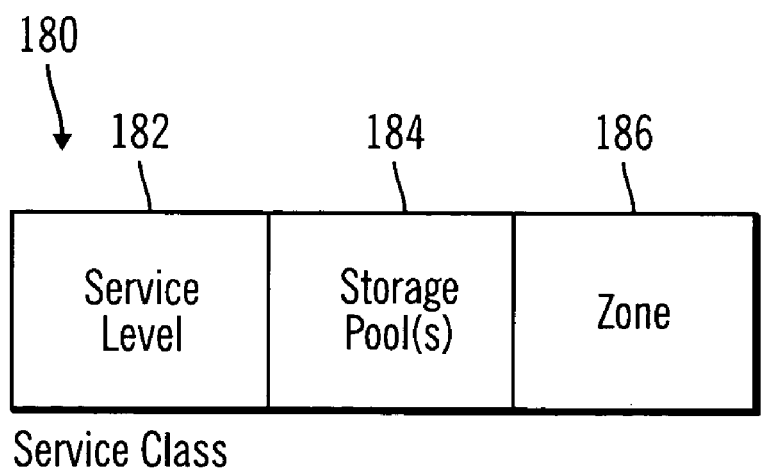
FIG. 7 illustrates service class information.

FIG. 7 illustrates service class 180 information on a level of service to provide to users of the network, such as gold, silver, bronze, etc. For instance, a customer, i.e., client 10a, 10b . . . 10n, may pursue a service level agreement (SLA) with storage service provider that maintains a network 14, including the metadata cluster 2 and storage pools 8a, 8b . . . 8n, concerning the criteria under which network storage resources are provided. The storage criteria that differs for different service levels may include the storage capacity, network throughput, I/O response time, I/O operations per second, and other performance criteria under which the network resources will be provided. In certain situations, multiple customers, i.e., clients 10a, 10b . . . 10n, with different levels of requirements specified in their service level agreements will share the same network resources, e.g., filesets and storage pools. This requires that the storage service provider monitor and manage the network resources to ensure that the different customer requirements specified in the different service level agreements are satisfied.

FIG. 7 illustrates service class 180 information including a service level 182, such as gold, bronze, silver, etc., and the storage pools 184 that are used by members of the service class 180. For instance, the storage pools 184 for a higher service level would have higher throughput, faster access, greater reliability and availability, etc. In certain embodiments, the storage devices or storage pools 184 associated with a service level 182 are capable of being included in multiple zones. A zone 186 indicates the zone in which the storage pool 184 is included. If different storage pools associated with one service level are in different zones, then there would be different service class entries 180 for the different service level/storage pool/zone triplet of information. If a client virtual file system 12a, 12b. . . 12n submits a request to create a file in a fileset at a specified service level, then the file would be created in the storage pool associated with the specified service level and the zone 186 associated with the fileset including the created file and/or client. When no service level or pool is chosen by the rule, then the default service level or pool is selected based on the zone of the fileset in which the file is created. In certain embodiments, a fileset and storage pool may belong to only one zone, such that service class 180 information associates only one storage pool with one zone, and that multiple zones and corresponding storage pools can be associated with one service level. In additional embodiments, a storage pool can belong to multiple zones within a single service level, so that one service level maps to a storage pool which is included within multiple zones.

Figure 8:
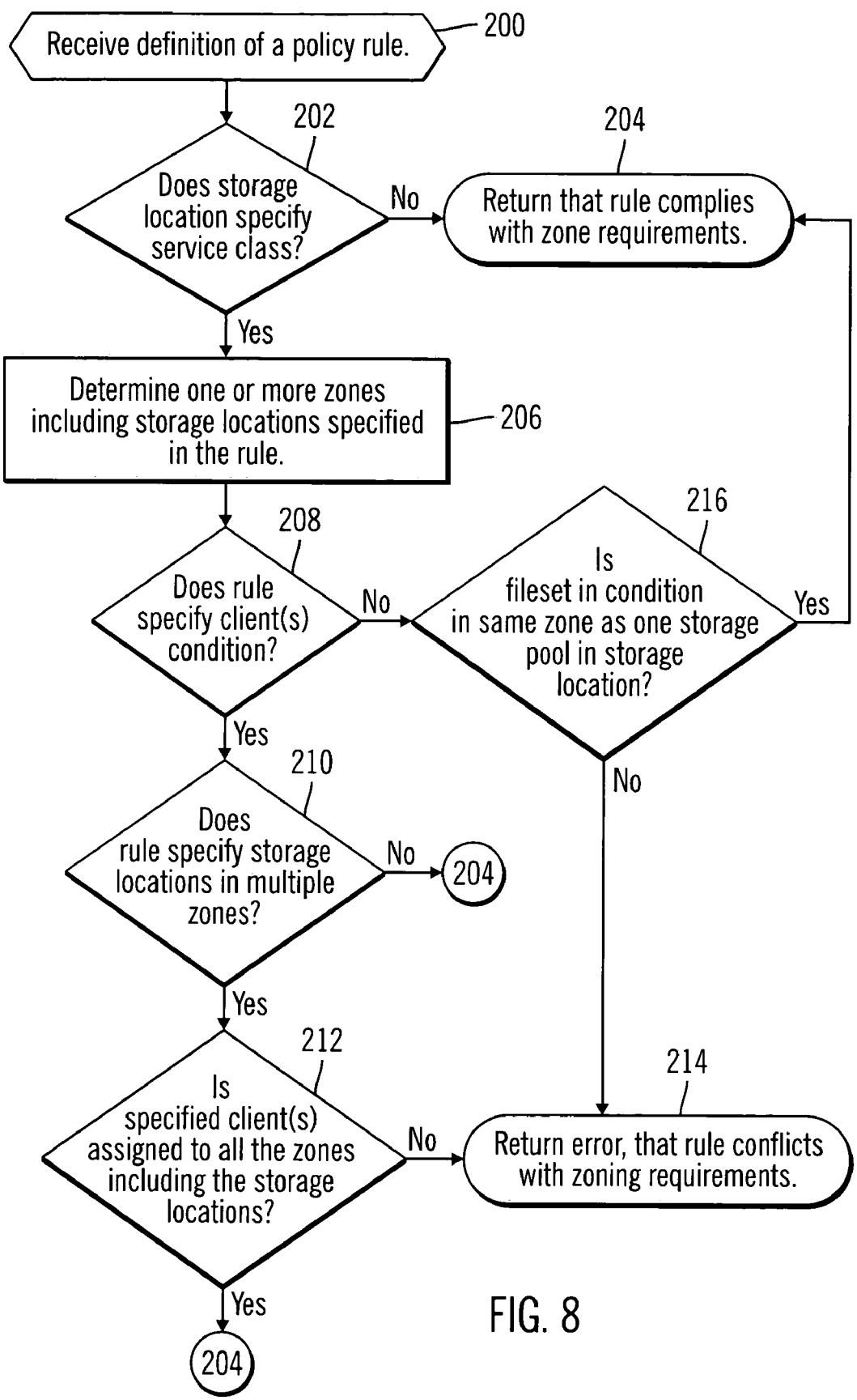
FIG. 8 illustrates operations to add a policy rule.

FIG. 8 illustrates operations performed by the metadata server 6a, 6b . . . 6n to determine whether a new policy rule 170 being submitted to add to the policy rule database 16 complies with the requirements of the zones. Upon receiving (at block 200) a policy rule 170 definition, if (at block 202) the storage location 174 specifies a service class 180, so that files satisfying the condition are stored in a storage pool 184 (FIG.

8) associated with a particular service level 182, then the rule is accepted (at block 204) because the rule complies with zone requirements. An accepted rule is added to the policy rule database 16. A rule 170 having a service class 180 storage location satisfies the requirements because a service class 180 is permitted to specify storage pools 8a, 8b . . . 8n that span multiple zones. If (at block 202) the rule 170 does not specify a service class storage location 174, then a determination is made (at block 206) of one or more zones including the storage locations 174 indicated in the received rule, where the storage locations may comprise storage pools or storage devices.

If (at block 208) the rule condition 172 specifies one or more clients 10a, 10b . . . 10n and if (at block 210) the received client condition rule specifies storage location 174 in multiple zones, then a determination is made (at block 212) whether the clients 10a, 10b . . . 10n specified in the condition 172 are in all the determined zones including the storage locations 174. If so, then control proceeds to block 204 to accept the policy rule because the clients to which the condition 172 applies are assigned to all the zones including the storage locations 174 to which the files from the clients are written. Otherwise, if the clients in the condition 172 are not assigned to all the zones to which the files form these clients may be written, an error is returned (at block 214) because the rule 170 conflicts with the zoning requirements. If (at block 210), the client condition rule 172 does not specify storage locations 174 in multiple zones, then the rule is accepted (at block 204).

If (at block 208) the rule specifies a fileset or file type condition 172 and if (at block 216) the fileset condition 172 specifies a fileset that is not in one same zone including the storage pools identified in the storage locations 174 of the rule, then an error is returned (at block 214) because the rule does not provide one storage pool that is in the same zone including the fileset specified in the rule. Thus, a storage pool may be associated with multiple zones, however the fileset in the rule condition 172 must be associated with the zones including at least one storage pool identified in the rule. If (at block 216) the storage locations 174 are not in multiple zones, then the rule is accepted (at block 204) and added to the policy rule database 16.

Figure 9:
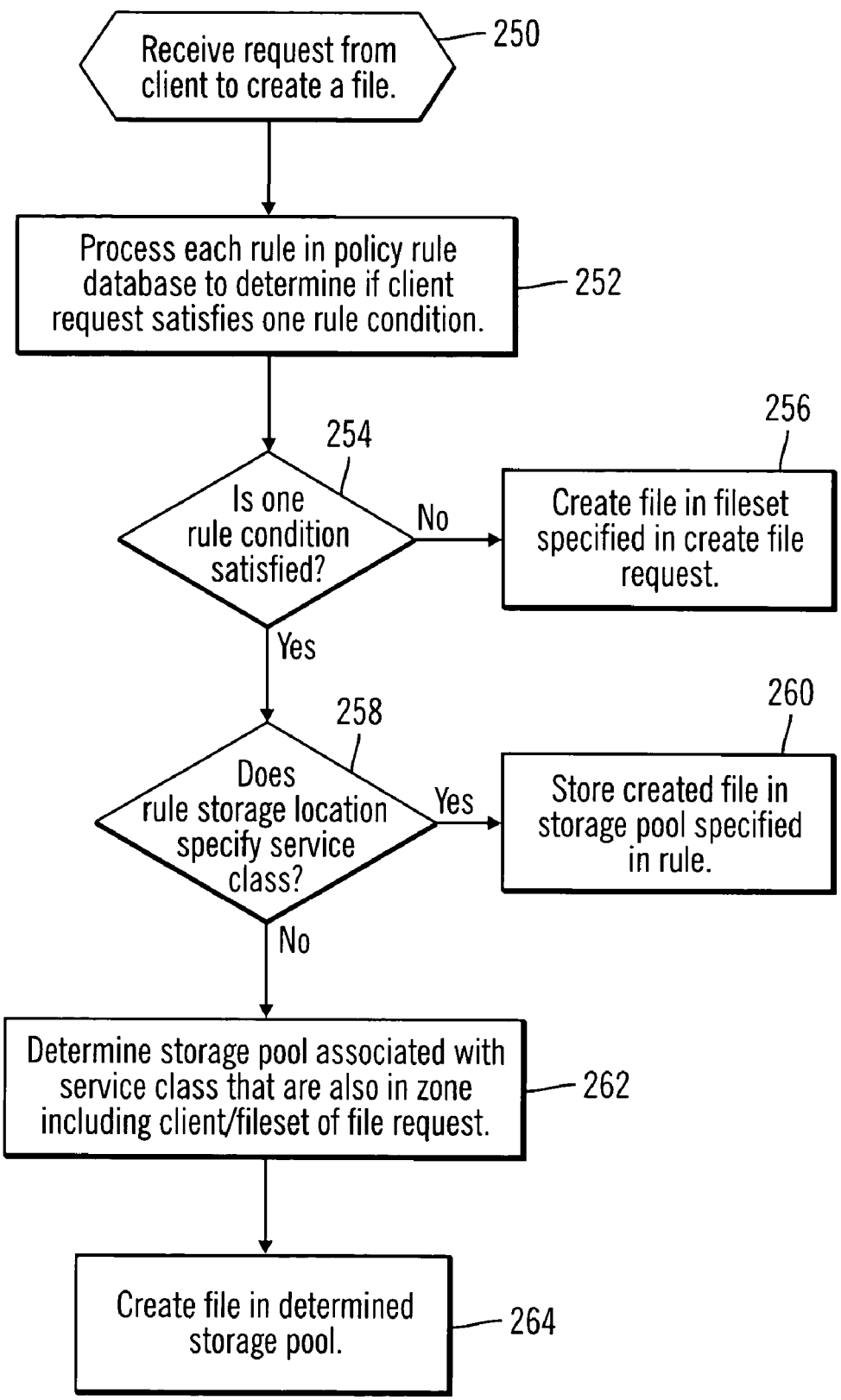
FIG. 9 illustrates operations to create a file in the namespace.

FIG. 9 illustrates operations performed by the metadata server 6a, 6b . . . 6n to create a file in response to a client virtual file system 12a, 12b . . . 12n create file request. Upon receiving (at block 250) a create file request, the metadata server 6a, 6b . . . 6n processes (at block 252) each rule in the policy rule database 16 to determine if the create file request satisfies one rule condition 172 to apply. For instance, if the rule condition 172 specifies a file type, then the condition 172 is satisfied if the file to create is of the specified file type; if the condition 172 specifies a fileset, then the condition 172 is satisfied if the file is to be created in the specified fileset; and if the condition 172 specifies a client, then the condition 172 is satisfied if the specified client initiates the create file request. If (at block 254) no rule 170 in the policy rule database 16 is satisfied, then the metadata server 6a, 6b . . . 6n creates (at block 256) the requested file in the fileset 52a, 52b . . . 52n specified in the create file request.

If (at block 254) the condition 172 of one rule 170 is satisfied and if (at block 258) the storage location 174 does not specify a service class 180, which means the storage location 174 comprises a storage pool 54a, 54b . . . 54n, then the file to create is stored (at block 260) in the specified storage pool. Otherwise, if (at block 258) the storage location 174 specifies a service class 180, then a determination is made (at block 262) of the storage pool 184 associated with service class 180 that is also in the zone including the client 10a, 10b . . . 10n or fileset 52a, 52b . . . 52n specified in the condition 172 of the rule 170. The file is created (at block 264) in the determined storage pool 54a, 54b . . . 54n. In this way, if the rule specifies a storage class location 174, then a determination is made of what storage pool in the storage class 170 is in the zone to which the client or fileset is assigned.

In further embodiments, the zone information may be used to verify client connectivity to storage pools during client discovery. For instance, during discovery, the clients 10a, 10b . . . 10n may discover connected devices, including storage pools, e.g., 8a, 8b . . . 8n, and then pass the information on the discovered devices to the metadata servers 6a, 6b . . . 6n, to determine whether the discovered devices are in zones including the discovering client, so that a client is only enabled to access those discovered devices in zones including the discovering client.

Described embodiments provide techniques to restrict clients, filesets and/or storage pools to specific zones, such that the clients are restricted to accessing those filesets in the zones to which they are assigned. This allows clients to be limited to viewing and accessing only filesets in the zones to which they are associated. In this way, an organization may restrict user access to particular filesets or sections of a global namespace for security or management related reasons.

ADDITIONAL EMBODIMENT DETAILS

The described operations may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art.

The described operations may be performed by circuitry, where "circuitry" refers to either hardware or software or a combination thereof. The circuitry for performing the operations of the described embodiments may comprise a hardware device, such as an integrated circuit chip, Programmable Gate Array (PGA), Application Specific Integrated Circuit (ASIC), etc. The circuitry may also comprise a processor component, such as an integrated circuit, and code in a computer readable medium, such as memory, wherein the code is executed by the processor to perform the operations of the described embodiments.

The illustrated operations of FIGS. 4, 5, 9, and 10 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method maintaining information on a namespace comprised of filesets shared by clients over a network, comprising:
    maintaining zone information on at least one zone, wherein each zone associates at least one client, at least one of the filesets in the namespace, and at least one storage pool, wherein for each zone, the associated at least one fileset and at least one storage pool are accessible to the at least one client associated in the zone;
    receiving a request from one of the clients for filesets accessible to the client in the namespace;
    determining from the zone information at least one zone associating the requesting client with at least one fileset and at least one storage pool;
    providing the requesting client with the information on the at least one fileset indicated in the determined at least one zone associating the client;
    receiving one rule identifying a condition and storage pools in which to store files if the condition is satisfied;
    determining whether the storage pools identified in the received rule are included in multiple zones; and
    rejecting the received rule in response to determining that a specified fileset in the condition is not included in one zone including the storage pools identified in the received rule.

2. The method of claim 1, wherein one client associated with multiple zones is enabled to access the filesets and storage pools in the associated zones.

3. The method of claim 1, wherein each client is restricted to performing operations with respect to file sets and storage pools in the at least one zone including the client.

4. The method of claim 1, wherein the rule condition indicates at least one client, further comprising:
    determining whether the at least one client indicated in the rule condition is included in the determined multiple zones; and
    failing the received rule in response to determining that the at least one client is not included in one of the determined multiple zones.

5. The method of claim 1, wherein the condition indicates at least one of a fileset, file class, or client, wherein the condition is satisfied if a request to create a file satisfies the condition.

6. The method of claim 1, wherein a service class associates a service level with storage pools and zones, wherein multiple storage pools and zones are capable of being associated with one service level.

7. The method of claim 6, further comprising:
    receiving a request to create a file from one client;
    determining a rule specifying one service class that is applicable to the received request;
    determining at least one storage pool included in the specified service class that is in a zone applicable to the client that initiated the request; and
    creating the requested file in an area of the determined at least one storage pool.

8. The method of claim 1, wherein the zone information is maintained by a metadata server in communication with the clients and wherein the metadata server provides the clients information on the filesets included in the namespace that the clients are enabled to access, wherein the metadata server further performs:
    receiving a request from one client to create a file;
    determining whether one rule applies to the file create request indicating at least one storage pool in which to create the file; and
    creating the file in a location in the at least one storage pool indicated in the rule in response to determining that one rule applies.

9. The method of claim 1, wherein the at least one storage pool comprises at least one storage device, wherein each storage device is restricted to being included in one storage pool.

10. The method of claim 1, wherein the zone information is used to verify client connectivity to storage pools during client discovery, wherein the client is enabled to only access storage pools in zones including the client performing discovery.

* * * * *